May 16, 1944.  E. J. OTTO  2,348,994
SHEAVE
Filed Feb. 15, 1943  2 Sheets-Sheet 1
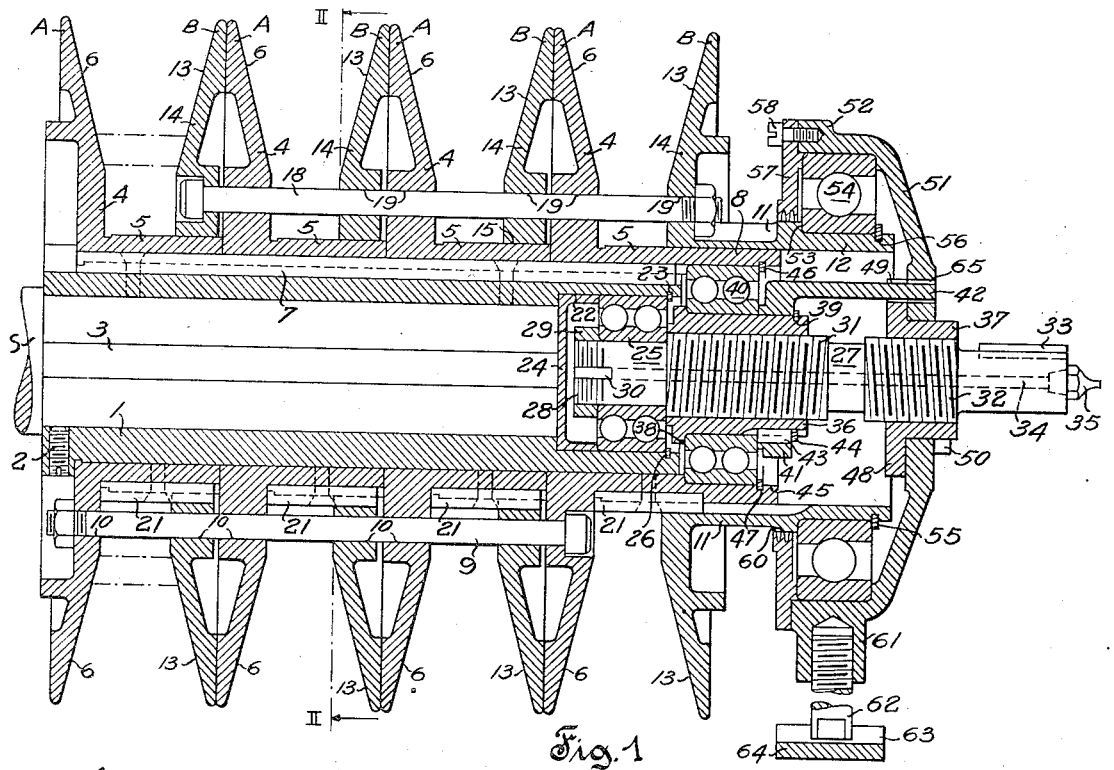
Fig. 1
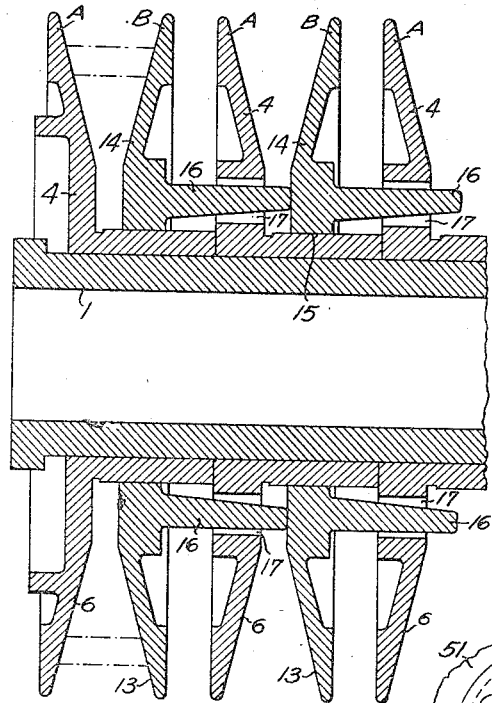
Fig. 2
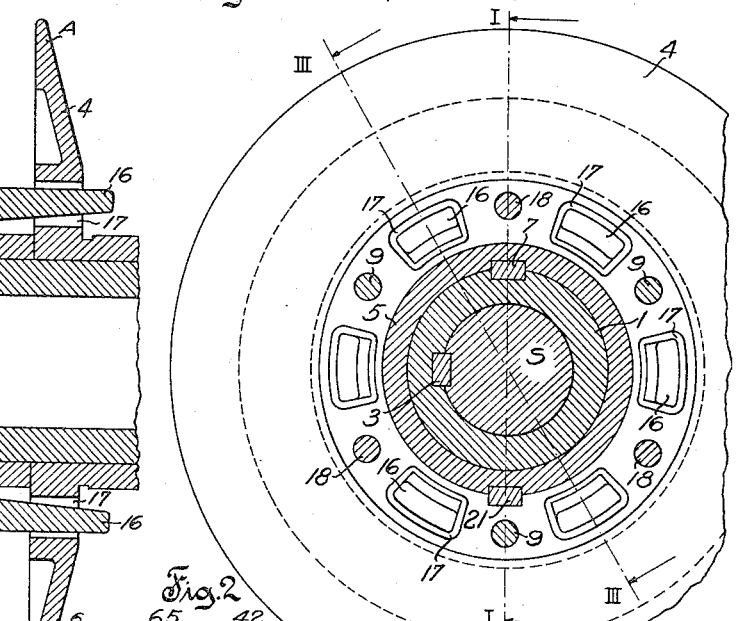
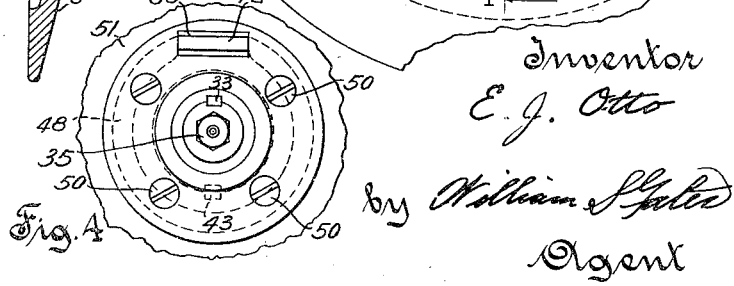
Fig. 3  Fig. 4
Inventor
E. J. Otto
by William S. Gates
Agent May 16, 1944.  E. J. OTTO  2,348,994
SHEAVE
Filed Feb. 15, 1943  2 Sheets-Sheet 2

Inventor
E. J. Otto
by William S. _____
Agent

Patented May 16, 1944

2,348,994

UNITED STATES PATENT OFFICE 2,348,994

SHEAVE

Eugene J. Otto, Milwaukee, Wis., assignor to Allis-Chalmers Manufacturing Company, Milwaukee, Wis., a corporation of Delaware Application February 15, 1943, Serial No. 475,901

6 Claims. (Cl. 74—230.17)

This invention relates to variable pitch V-belt sheaves or pulleys.

An object of the invention is to provide a simple V-belt sheave in which the pitch diameter of the sheave may be varied while the sheave is in motion without changing the plane of the belts.

A further object is to provide such a sheave in which both of the belt engaging parts of the sheave are movable symmetrically relative to the plane of the belt while the sheave is in motion.

A still further object of the invention is to provide a structurally strong removable sheave having a main shaft engaging sleeve, at least two belt engaging disks, and a controlling device for moving the belt engaging disks symmetrically relative to a fixed transverse plane.

A still further object is to provide a means for preventing relative rotation of two nuts on right and left hand threaded portions of a controlling screw for a variable pitch sheave and for giving an indication of the pitch diameter of the sheave.

Other objects will appear from the following description and drawings in which:

Fig. 1 is a longitudinal sectional view of a variable pitch sheave according to the invention, taken on the line I—I of Fig. 2, assembled on a shaft;

Fig. 2 is a fragmentary cross-sectional view taken on the line II—II of Fig. 1;

Fig. 3 is a fragmentary section on the line III—III of Fig. 2 with the shaft removed;

Fig. 4 is a fragmentary end elevation showing the means for preventing relative rotation of the controlling nuts as viewed from the right of Fig. 1;

Like reference characters refer to similar parts in the various views of the drawings.

Figure 5:
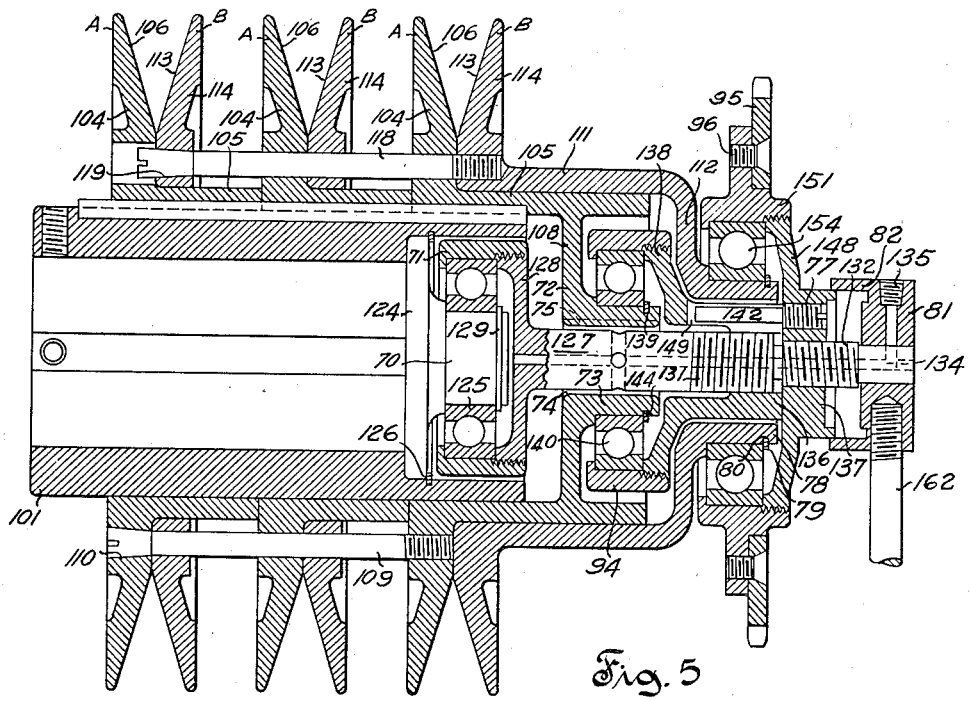
Fig. 5 is a longitudinal sectional view similar to Fig. 1 of a modified form of the invention with the shaft removed.

Variable pitch V-belt sheaves in which the belt engaging members are movable oppositely while the sheave is in motion are known to the art. Adjusting mechanisms for such sheaves embodying oppositely threaded screws are also known. The applicant, however, has devised a simple, structurally strong removable unit for mounting on a shaft end, in which the controlling mechanism is efficiently and compactly arranged and easily manufactured and assembled. Avoidance of hollow, slotted and apertured shafts, lack of complicated external connections, structure well sealed for good lubrication and dust exclusion, and provision of a simple pitch indicator are some important features.

In its preferred form the invention consists of a sheave having a main sleeve 1 removably secured on a shaft S as by set screw 2 and key 3. Concentrically mounted on the main sleeve 1 in slidable non-rotatable relation are one or more sheave disks 4 formed as radial flanges on flanged sleeves or sleeve-like hubs 5. The disks 4 are provided with belt engaging faces 6. The flanged sleeves 5 are prevented from rotation relative to the main sleeve 1 by key 7 in a well known manner. Where only one of these sleeves 5 is used, to form a single grooved sheave, the sleeve 5 projects past the end of main sleeve 1 to form an adjusting connection 8 connected with an adjusting mechanism to be described hereinafter. Where a plurality of such sleeves 5 is employed to form a multiple grooved sheave, all the sleeves 5 are placed on the main sleeve 1 in abutting relation, the end one, to the right in Fig. 1, having an adjusting connection 8 while the remaining sleeves 5 are of equal length and act as spacing members. All the flanged sleeves 5 are then clamped together as a rigid unit by bolts 9 passed through alined openings 10 in the flanges 4 of sleeves 5, extending parallel to the axis of shaft S and located radially inward of the belt engaging faces 6. Bolts 9 engage the outer faces of the end flanges of the group. All these flanged sleeves 5 and their belt engaging faces extend in one direction towards the end of shaft S, and form a movable group of sheave disks generally designated as A in the drawings.

Mounted concentrically on the end flanged sleeve 5 which forms adjusting connection 8 is a flanged sleeve 11 on which is formed a second adjusting connection 12 coaxial with adjusting member 8 and extending in the same direction. The flanged sleeve 11 is provided with a substantially conical belt engaging face 13 on its flange or disk 14, facing opposite to the sleeve and opposed to the adjacent belt engaging face 6 of the flanged sleeve 5. Where a multiple groove sheave is desired, additional disks 14 are provided having central apertures 15 and belt engaging faces 13. Each of these flanges 14 is mounted in axially slidable non-rotatable relation on the sleeve-like hub portion of a corresponding flanged sleeve 5, with its belt engaging face 13 opposed to the adjacent belt engaging face 6 of a flanged sleeve 5. Each said additional disk 14 is provided with a plurality of rearwardly extending lugs 16 which are arranged to freely pass through corresponding apertures 17 in the sheave disk 4 to the rear thereof as shown in Fig. 2. These lugs 16 are of equal length and are arranged to abut the face of a next adjacent disk 14. The disks 14 are clamped together to form a rigid unit with flanged sleeve 11 by means of bolts 18 engaging the end disks 14 as shown in Fig. 1, and passing through alined axially extending holes 19 in disks 14 and 4 radially inward of belt engaging faces 6 and 13. This unit forms a second group of sheave disks generally designated as B in the drawings. Disks 14 are of course provided with holes 10 alined with the holes 10 in disks 4 to permit the insertion of bolts 9. Thus, in the case of multiple grooved sheaves, two relatively movable groups A and B of alternating sheave disks are assembled with opposed belt engaging faces 6 and 13 forming a plurality of belt engaging grooves. The disks or flanges of each group are relatively fixed. The group A is prevented from rotation relative to main sleeve 1 by key 7 in an obvious manner and is slidable axially relative to main sleeve 1. The group B is fixed against rotation relative to flanged sleeves 5 by means of keys 21 in an obvious manner, and is slidable as a group axially relative to group A and main sleeve 1. The relative position of the two groups A and B of sheave disks may be determined by a pitch diameter adjusting mechanism to be described hereinafter, engaging the projecting adjusting connections 8 and 12.

One form of pitch diameter adjusting mechanism is shown in Figs. 1-4 of the drawings. The outer end of main sleeve 1 is provided with an enlarged bore 22 and an internal groove 23 near the outer end of bore 22. A tight fitting cup shaped member 24 is inserted in bore 22 forming an oil retaining wall. A cimbined thrust and journal bearing 25 of a commonly known type is inserted in bore 22 with its outer race abutting the periphery of cup member 24 and extending to groove 23. Snap ring 26 is inserted in groove 23 fixing bearing 25 against axial displacement relative to main sleeve 1. In the inner race of bearing 25 is mounted an adjusting screw or plug 27, secured therein by a threaded portion 28 of reduced diameter and a nut 29 locked in position by a key 30 in an obvious manner. Adjusting screw 27 is thus axially fixed and freely rotatable relative to main sleeve 1. Adjusting screw 27 is provided with two axially spaced oppositely threaded portions 31 and 32 and is provided at its projecting end with a key 33 or other known means for attaching a manual control crank or wheel (not shown). The screw 27 may be drilled, as at 34, for lubricant injection and may be provided with any known form of fitting 35 for introduction of a lubricant.

Operatively engaged with threaded sections 31 and 32 are correspondingly threaded adjusting nuts 36 and 37. Inner nut 36 is provided with a shoulder 38 and a groove 39 in its peripheral surface. A bearing 40 similar to bearing 25 is assembled on nut 36 abutting shoulder 38. A ring member 41 provided with an outwardly extending eccentric lug 42 is assembled in abutting relation to the inner race of bearing 40 and held against rotation relative to nut 36 by a key 43. Bearing 40 and ring member 41 are fixed against axial displacement relative to nut 36 by snap ring 44 inserted in groove 39. The outer race of bearing 40 is inserted in an enlarged bore 45 in the projecting adjusting connection 8 of a flanged sleeve 5, and fixed against axial displacement relative to said flanged sleeve 5 by a snap ring 46 in an internal groove 47.

Nut 37 is provided with a radial flange 48 having an eccentric opening 49 therein axially alineable with the eccentric lug 42, so that when the two nuts are assembled on their respective threaded sections 31 and 32, lug 42 engages opening 49 to prevent relative rotation of nuts 36 and 37, while permitting relative axial movement of nuts 36 and 37 upon rotation of adjusting screw 27 relative thereto. Secured to the flange 48 as by cap screws 50 is an annular mushroom-shaped bearing retainer 51 with a rim 52 facing inward or toward the flanged sleeve 11 and concentrically surrounding the adjusting connection 12. The adjusting connection 12 of flanged sleeve 11 is formed with an external shoulder 53. A combined thrust and journal bearing 54 of known type is assembled on the adjusting connection 12 and fixed against axial displacement relative thereto by a snap ring 55 of suitable known type in an external groove 56 in the periphery thereof. The outer race of bearing 54 is fitted in the rim 52 and retained against axial displacement relative to the bearing retainer 51 by an annular oil sealing and bearing retaining ring 57 secured to rim 52 as by cap screws 58. The internal aperture of the sealing ring 57 is of such size as to form a running fit having a lubricant-retaining clearance with the external surface of flanged sleeve 11 as shown at 60.

At one point in the periphery of bearing retainer 51 a boss 61 is provided to which a radial rod 62 may be threadedly secured. The end of rod 62 may engage a slot or groove 63 parallel to the axis of shaft S in a stationary block 64. Engagement of rod 62 and groove 63 holds bearing retainer 51 and nuts 37 and 36 against rotation, while permitting axial motion thereof.

The lug 42 may be arranged to extend out through an aperture 65 in bearing retainer 51, and a graduated scale (not shown) may be engraved or otherwise marked on lug 42 so that the portion of lug 42 extending outside the external surface of bearing retainer 51 provides a measure of the pitch diameter of the sheave.

The operation of the preferred embodiment is as follows: Bearing 25 fixes the axial position of adjusting screw 27 relative to the main sleeve 1 and shaft S, to which sleeve 1 is securely fastened in driving or driven relation. The movable sheave disk group A is fixed in axial position relative to nut 36 which has its axial position determined by its angular position relative to adjusting screw 27. The movable sheave disk group B is fixed in axial position relative to nut 37 which has its axial position determined by its angular position relative to adjusting screw 27. Thus, with sections 31 and 32 oppositely threaded with equally pitched threads, angular motion of adjusting screw 27 will move the two sheave disk groups A and B symmetrically relative to a fixed transverse plane through the main sleeve 1, and will change the effective pitch diameter of the sheave without moving the planes of the belts relative to the main sleeve 1 and the shaft S. The angular position of adjusting screw 27 may be determined by any desired manually or mechanically operable device (not shown) attached to the projecting end of screws 27 at 33. By this means the invention provides a compact sheave capable of being readily attached to or detached from a driving or driven shaft and capable of adjustment as to pitch diameter, while in motion without change in the axial position of the shaft or the medial planes of the belt grooves. The adjusting mechanism is substantially enclosed within a non-rotating casing formed by mushroom-shaped bearing retainer 51.

In the modification as illustrated in Fig. 5, parts corresponding to those of Fig. 1 bear corresponding numerals of the 100 series. An alternative form of binding means for the sheave disk groups is shown, in which taper headed screws 109 and 118 threadedly engage end flanged sleeves 105 and 111, respectively, the heads engaging taper holes 110 and 119, respectively, in another flanged sleeve 105 or disk 114. In this modified form, the cup shaped member 24 of Fig. 1, is replaced by a disk 124 with stub spindle 70 on which is mounted the inner race of bearing 125, held in axial position relative to sleeve 1 by snap rings 126 and 129. The outer race of bearing 125 is held in fixed axial relation to a threaded disk-like flange 128 on the inner end of adjusting screw 127 by a bearing retaining ring 71 threadedly engaging the flange 128. The adjusting connection 108 of flanged sleeve 105 is formed as an integral internal flange 72 having an outwardly extending sleeve portion 73 with an axial bore 74 arranged to freely clear the body of screw 127. A lubricant groove 75 permits free flow of lubricant past the flange 72. On the external surface of sleeve 73 is mounted in axially fixed relation the inner race of a bearing 140, secured in place by a snap ring 144 in a groove 139. The adjusting screw 127 is provided with two oppositely threaded portions 131 and 132 of which the outer 132 is of reduced diameter. Nut 136 engaging threaded portion 131 is provided with a threaded flange 138. A threaded bearing retaining ring 94 secures the outer race of bearing 140 in axially fixed relation to the flange 138. Nut 136 is provided with an axially extending slot or groove 149, the purpose of which appears hereinafter. Nut 137 engages the threads of threaded portion 132 of screw 127 which threads are equal in pitch to those of portion 131. Nut 137 is provided with a threaded flange 148 to which is threaded a bearing retaining ring 151 arranged to axially secure the outer race of a bearing 154 with respect to the flange 148. Bearing ring 151 may be provided with any known manual or mechanical adjusting means such as the sprocket 95 secured by screws 96. Nut 137 is also provided with an inwardly extending lug 142 alineable with groove 149, which may be secured to flange 148 as by threads 77. The lug 142 in assembled position extends into groove 149 and prevents relative rotation of nuts 136 and 137. The outer end of sleeve 111 is flanged inwardly toward the axis, axially outward of adjusting connection 108 to form adjusting connection 112 consisting of a sleeve 78 of reduced diameter, the inner bore of which is arranged to surround and freely clear the nut 136. The inner race of bearing 154 is axially fixed on the outer surface of sleeve 78 of the adjusting connection 112 and secured by a snap ring 79 in a groove 80. On the projecting end of screw 127 is rigidly mounted a head member 81 which is held in a fixed position by a fixed rod 162 thus holding screw 127 against rotation. The head member 81 and screw 127 may be bored for lubrication as at 134 and a lubricating fitting (not shown) may be attached at 135 in any known manner.

In the modification of Fig. 5, adjustment is made by rotating the nuts 136 and 137 by turning the nut 137 as by sprocket 95. Turning motion of nut 137 will be transmitted equally to nut 136 by lug 142 engaging groove 149, and since screw 127 is held stationary by rod 162, the turning of the nuts 136 and 137 will cause relative symmetrical axial movement of the nuts. As the adjusting connections 108 and 112 are axially fixed relative to nuts 136 and 137, respectively, by bearings 140 and 154, respectively, turning of nut 137 will cause relative axial movement of the sheave disk groups A and B and will vary the pitch diameter of the sheave. It should be noted that in this modification the part of bearings 125, 140 and 154 which rotates with the sheave is in each case the inner race. This arrangement is conducive to efficient bearing lubrication due to the action of centrifugal force in spreading the lubricant. The head member 81 may be provided with a sleeve like extension 82 engaging the external surface of nut 137 with a lubricant-sealing clearance to permit axial movement and rotation of the nut. Bearings 125, 140 and 154 may be provided with lubricant sealing members of known type (not shown).

Figure 6:
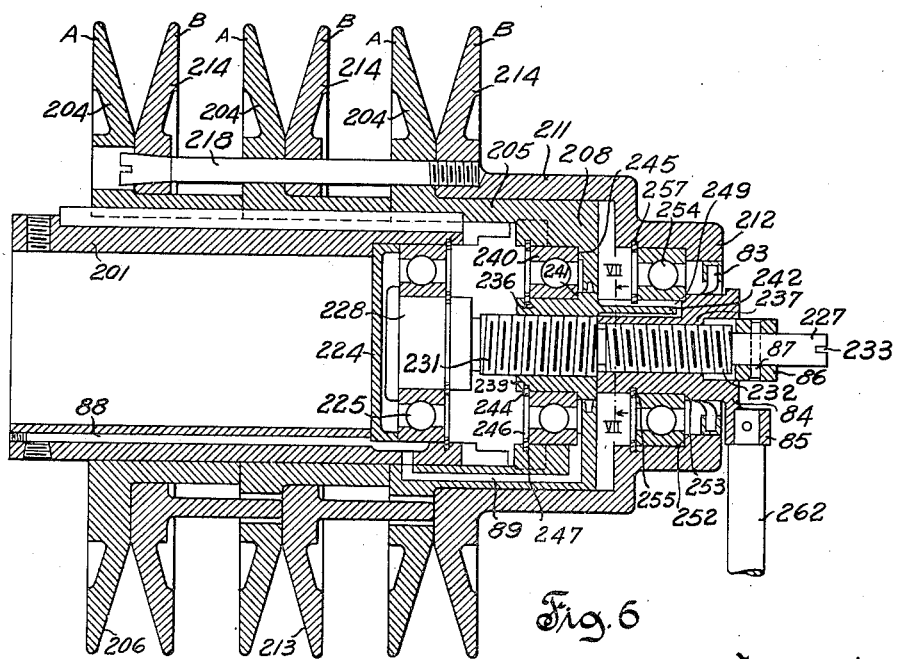
Fig. 6 is a longitudinal sectional view of a further modification of the invention.
Figure 7:
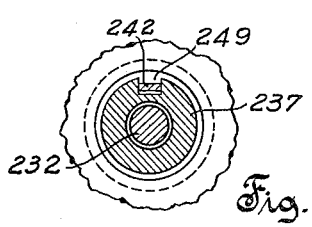
Fig. 7 is a fragmentary cross-section on the line VII—VII of Fig. 6.

In the modification shown in Figs. 6 and 7, parts corresponding to those of Fig. 1 bear corresponding numbers of the 200 series. A stepped adjusting screw 227 is provided, in which the inner end or bearing seat part 228 is of larger diameter than threaded portion 231 and threaded portion 232 is of smaller diameter than threaded portion 231. In this modification, as in that of Fig. 5, the end flanged sleeves are provided with adjusting connections 208 and 212 of reduced diameter. In this modification, however, each of the adjusting connections 208 and 212 coaxially surrounds its respective adjusting nut. Bearing 240 has its outer race secured against axial displacement relative to sleeve 205 by shoulder 245 and a snap ring 246 in a groove 247. The inner race is secured on nut 236 between a shoulder 241 and a snap ring 244 inserted in a groove 239. Lug 242 in this modification is made integral with nut 236. Bearing 254 has its outer race secured within connection 212 of sleeve 211 between shoulder 252 and snap ring 257 in an obvious manner. The inner race of bearing 254 is secured against axial displacement relative to nut 237 by shoulder 253 and snap ring 255. Nut 237 is provided with an eccentric slot or opening 249 which is engaged by lug 242 in axially movable relation to prevent relative rotation of nuts 236 and 237. Nut 237 is provided with an extension 84 which projects beyond the end of adjusting connection 212, and is provided with a boss 85 to which is attached a rod 262 fixed against rotation in a manner similar to rod 62 of Fig. 1. Screw 227 is provided with a projecting end having a slot 233 or other known means for attachment of a manual or mechanical control (not shown). A stop collar may be provided as at 86 secured in any known manner as by a pin 87. A lubricant retaining packing 83 of known design may be provided between coaxial surfaces of adjusting connection 212 and nut 237. The action of this modification will be seen to be so similar to that of the device of Figs. 1–4 as to require no special explanation. In this modification an alternative lubrication passage 88 is shown in sleeve 201 communicating with a passage in movable sleeve 205 such as 89 and with the associated bearing 240 for injection of lubricant into the interior of the sheave adjusting mechanism.

While specific embodiments of this invention have been illustrated and described, it will be understood that such modifications and equivalents as may readily occur to persons skilled in the art are intended to be included within the scope of this invention which is limited only by the scope of the claims appended hereto.

It is claimed and desired to secure by Letters Patent:

1. In a variable pitch diameter sheave construction having a main sleeve and at least two movable sheave disks mounted on concentric sheave disk sleeves thereon, a pitch diameter controlling mechanism comprising an axially extending plug member, a first bearing means rotatably connecting said main sleeve and plug and fixing said plug against axial displacement relative to said main sleeve, said plug having axially spaced oppositely threaded sections, oppositely threaded axially inner and outer members coacting with said oppositely threaded sections, means operatively connecting said threaded members to prevent relative rotation thereof, second bearing means connecting said axially inner threaded member with the radially inner of said sheave disk sleeves, said axially outer threaded member having a mushroom-shaped flange extending radially past the ends of said sheave disk sleeves and overhanging the axially outer ends of said radially outer sheave disk sleeve, third bearing means connecting said axially outer threaded member and said radially outer sheave disk sleeve in rotatable axially fixed relation, and means controlling the relative angular relationship of said plug and said threaded members.

2. In a variable pitch diameter sheave construction having a main sleeve and at least two movable sheave disks mounted on concentric sheave disk sleeves thereon, a pitch diameter controlling mechanism comprising an axially extending plug member, a first bearing means rotatably connecting said main sleeve and plug and fixing said plug against axial displacement relative to said main sleeve, said plug having axially spaced oppositely threaded sections, oppositely threaded axially inner and outer members coacting with said oppositely threaded sections, an axially extending projection on one of said threaded members operatively connecting with the other said threaded member to prevent relative rotation thereof, second bearing means connecting said axially inner threaded member with the radially inner of said sheave disk sleeves, said axially outer threaded member having a mushroom-shaped flange extending radially past the ends of said sheave disk sleeves and overhanging the axially outer end of said radially outer sheave disk sleeve, third bearing means surrounding said outer end of said radially outer sheave disk sleeve and connecting said mushroom-shaped flange and said radially outer sheave disk sleeve in rotatable axially fixed relation and means controlling the relative angular relationship of said plug and said threaded members.

3. In the structure of claim 2, said mushroom-shaped flange having an opening therein, and said axially extending projection extending therethrough, said projection and said flange coacting as a pitch diameter indicator.

4. In the structure of claim 2, an annular sealing member located between said third bearing member and said sheave disks, extending from said mushroom shaped flange to within sealing clearance of said radially outer sheave disk sleeve, said flange and annular member forming a substantially stationary protective housing for substantially all of said pitch diameter controlling mechanism.

5. In the structure of claim 2, all three of said bearing members having their operatively rotating parts radially inward of the parts connected to said plug and threaded members, respectively.

6. In the structure of claim 2, said first bearing member comprising a plate fixedly secured in said main sleeve, and having a coaxial spindle carrying the radially inner part thereof, all three of said bearing members having their operatively rotating parts radially inward of the parts connected to said plug and threaded members, respectively.

EUGENE J. OTTO.